United States Patent
Tremblay et al.

(10) Patent No.: US 12,454,738 B2
(45) Date of Patent: Oct. 28, 2025

(54) DEGASSING LAUNDER

(71) Applicant: PYROTEK, INC., Spokane, WA (US)

(72) Inventors: Sylvain Tremblay, Quebec (CA); Michael Klepacki, Newtown, CT (US); Ryan Moran, Bloomingburg, NY (US); Michael Balthazor, Homer, NY (US)

(73) Assignee: PYROTEK, INC., Spokane, WA (US)

( * ) Notice: Subject to any disclaimer, the term of this patent is extended or adjusted under 35 U.S.C. 154(b) by 871 days.

(21) Appl. No.: 17/611,442

(22) PCT Filed: May 13, 2020

(86) PCT No.: PCT/US2020/032720
§ 371 (c)(1),
(2) Date: Nov. 15, 2021

(87) PCT Pub. No.: WO2020/232152
PCT Pub. Date: Nov. 19, 2020

(65) Prior Publication Data
US 2023/0212711 A1    Jul. 6, 2023

Related U.S. Application Data

(60) Provisional application No. 62/847,415, filed on May 14, 2019.

(51) Int. Cl.
*C22B 9/02* (2006.01)
*C22B 21/06* (2006.01)

(52) U.S. Cl.
CPC .............. *C22B 9/02* (2013.01); *C22B 21/06* (2013.01)

(58) Field of Classification Search
CPC ......... C22B 9/02; C22B 21/06; C22B 21/064; F27D 2003/0083; F27D 2003/166; F27D 2027/002; F27D 3/16; F27D 27/00
(Continued)

(56) References Cited

U.S. PATENT DOCUMENTS 2,161,180 A    6/1939    Marx
3,839,019 A  * 10/1974  Bruno ................... C22B 21/064
                                                        75/681
(Continued)

FOREIGN PATENT DOCUMENTS

CA    2073706 A1    1/1994
CN    103952573 A    7/2014
(Continued)

OTHER PUBLICATIONS

JPS63303014 (Espacenet English translation version) Nakagawa et al., Apparatus for purifying molten metal, Dec. 9, 1988 (Year: 1988).*
(Continued)

*Primary Examiner* — Jessee R Roe
*Assistant Examiner* — Michael Aboagye
(74) *Attorney, Agent, or Firm* — Lippes Mathias LLP

(57) ABSTRACT

A degassing launder having a plurality of partition plates configured to block a flow of molten aluminum and including a plurality of domes. Two adjacent partition plates and two side walls of the launder form a degassing chamber. A lower portion of the partition plates is provided with a passage through which the molten aluminum flows into a next degassing chamber. The domes are arranged on the bottom of the launder.

14 Claims, 12 Drawing Sheets

(58) Field of Classification Search
USPC ............... 266/233, 235, 215, 216, 217, 242; 75/708
See application file for complete search history.

(56) References Cited

U.S. PATENT DOCUMENTS

| | | | |
|---|---|---|---|
| 4,047,938 A * | 9/1977 | Szekely | ................... F27D 3/16 |
| | | | 75/690 |
| 6,060,014 A | 5/2000 | Pelton | |
| 6,689,310 B1 | 2/2004 | Cooper | |
| 8,883,071 B2 * | 11/2014 | Reeves | ................. F27D 1/1808 |
| | | | 266/236 |
| 2011/0168707 A1 | 7/2011 | Reeves | |

FOREIGN PATENT DOCUMENTS

| | | | |
|---|---|---|---|
| EP | 0500052 A2 | 8/1992 | |
| EP | 0611830 A1 | 8/1994 | |
| JP | S63303014 | * 12/1988 | ............. C22B 21/06 |
| JP | S63303014 A | 12/1988 | |
| JP | H0762459 A | 3/1995 | |
| KR | 1020140027452 A | 3/2014 | |

OTHER PUBLICATIONS

International Search Report for PCT/US2020/032720, mailed Aug. 25, 2020, 2 pages.
Search Report for EP220804870.2, dated Jun. 13, 2023, 14 pages.

* cited by examiner

DEGASSING LAUNDER

This application claims the benefit of U.S. Provisional Application No. 62/847,415 filed May 14, 2019, the disclosure of which is herein incorporated by reference.

BACKGROUND

The present disclosure relates to a molten metal (e.g. aluminum) processing device, and more particularly, to a degassing launder. However, it is to be appreciated that the present exemplary embodiments are also amenable to other similar applications.

Molten metals such as aluminum and aluminum alloys include trace amounts of impurities that are preferably removed during refinement. Some of the impurities include dissolved hydrogen gas, particulates such as oxides, carbides, borides, alumina, magnesia and various other elements such as dissolved alkali metals (sodium (Na), lithium (Li) and calcium (Ca)). These impurities may otherwise cause undesirable effects in the casting process and to the properties of the finished product.

In aluminum processing, aluminum is often melted within a furnace and then transferred to a casting machine. The aluminum is typically transferred from the furnace to the casting machine through a trough. The molten aluminum flows into the trough at an inlet and through the trough to an outlet. In many instances, the trough includes an in-line degassing treatment assembly intended to remove at least a portion of the impurities within the molten aluminum.

In some instances, the treatment process utilizes a flux injection mechanism that is configured to introduce a flux within the molten aluminum. Generally, the flux comprises chlorine or a mixture of chlorine and argon or chlorine and nitrogen gas. Chlorine gas is known to be effective in converting the alkali metals to salts such as sodium chloride (NaCl), lithium chloride (LiCl) and calcium chloride ($CaCl_2$)) which coalesce and rise to the surface of the molten metal with the assistance of the inert gas (Ar or $N_2$). Hydrogen also diffuses into the inert gas bubbles and is removed as the particulate coalesces around the gas bubbles and rises to the top of the molten metal. The gas and impurities form dross or waste-by-product which is skimmed off or captured in a downstream filter. Generally, the reacted chloride compounds are removed with the dross.

An exemplary in-line degassing device is described in U.S. Pat. No. 5,656,236 which utilizes $N_2$, Ar or $N_2$—$Cl_2$ or Ar—$Cl_2$, the disclosure of which is herein incorporated by reference. The patent discloses a process for refining molten aluminum and molten aluminum alloys that utilizes various chambers including at least one disperser having an elongated rotating shaft attached to a rotor. The rotor is adapted to rotate within the molten aluminum as flux is discharged through the rotating shaft and distributed by the rotor within the chamber. The rotor and the rotating shaft are utilized to distribute the flux within the molten alloy to chemically interact with a high percentage of the impurities therein while utilizing a minimum amount of chlorine gas. The impurities then rise to the surface of the molten aluminum alloy and can be removed. Compared to a box-type in-line degassing device, the launder-type in-line degassing device has no residual molten metal at the end of the casting, may not require a heating system, and has low manufacturing, use, and maintenance costs.

In order to improve the degassing efficiency of the in-line degassing device, it is a common practice to increase a stirring speed of the rotor and a flow rate of the inert gas. However, an excessive stirring speed and gas flow rate may cause surface waves, resulting in a reaction of the molten aluminum with oxygen in the air to form aluminum dross. Excessive stirring speed and gas flow rates can also reduce the service life of the rotor and increase gas cost. Therefore, it would be desirable to develop an alternative effective approach to improve the degassing efficiency of the launder-type in-line degassing device while avoiding the above drawbacks.

BRIEF DESCRIPTION

Various details of the present disclosure are hereinafter summarized to provide a basic understanding. The summary is not an extensive overview of the disclosure and is neither intended to identify certain elements of the disclosure, nor to delineate scope thereof. Rather, the primary purpose of this summary is to present some concepts of the disclosure, in a simplified form prior to the more detailed description that is presented hereinafter.

According to a first embodiment, a degassing launder is provided. The launder includes a plurality of partition plates configured to partially block a flow of molten metal in the launder. Two adjacent partition plates, a floor, and two side walls of the launder form a degassing chamber. A lower portion of each partition plate is provided with at least one passage through which the molten aluminum flows. The floor of the degassing chamber is provided with a dome shaped projection.

According to a second embodiment, a rotor for dispersing gas into molten metal is provided. The rotor includes a hexagonal body having upper and lower faces and six sidewalls. An opening extends between the upper and lower faces According to a further embodiment, a degassing apparatus is provided. The apparatus includes a chamber having an inlet, an outlet, and a floor. A dome shaped projection is disposed on the floor and a rotor is disposed above the projection. The apparatus can optionally include a settling chamber.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
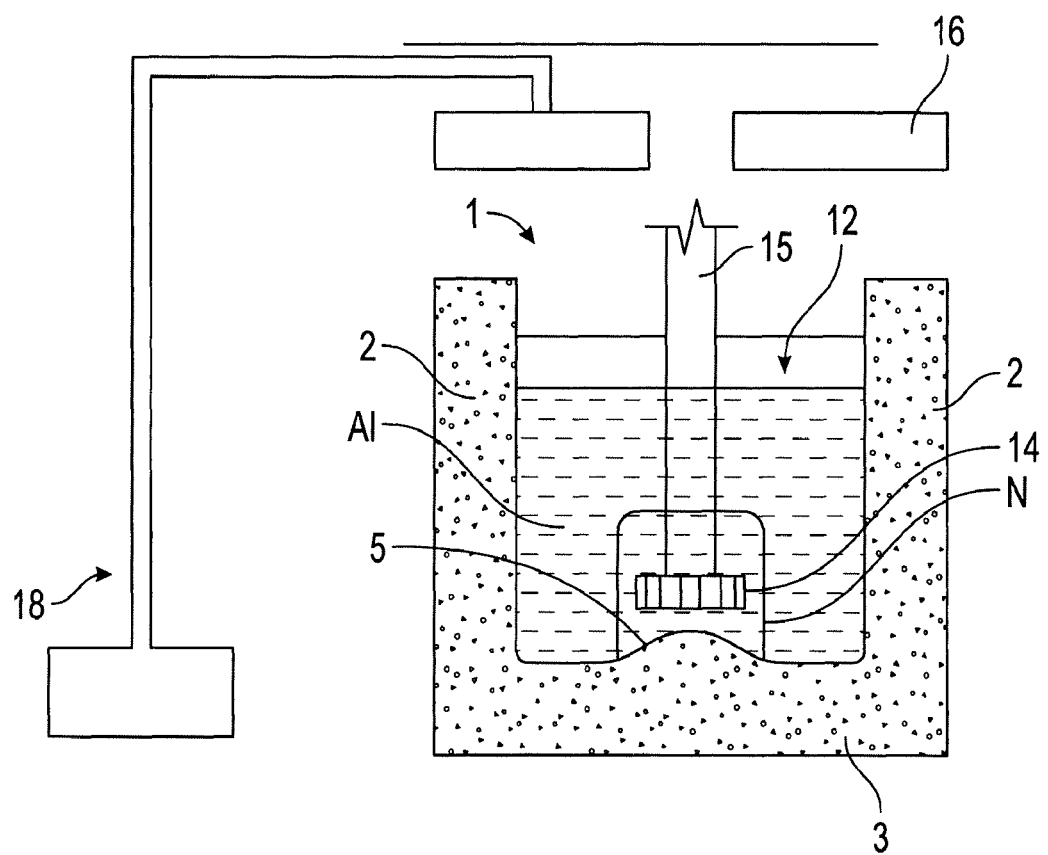
FIG. 1 is a plan view illustrating one configuration of the launder assembly of the present disclosure.

Reference will now be made in detail to the embodiments of the disclosure, examples of which are illustrated in the accompanying drawings. The present disclosure may be understood more readily by reference to the following detailed description of desired embodiments included herein and in the accompanying drawings. The figures are merely schematic representations based on convenience and the ease of demonstrating the present development, and are, therefore, not intended to limit relative size and dimensions of the components thereof.

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent can be used in practice or testing of the present disclosure. All publications, patent applications, patents and other references mentioned herein are incorporated by reference in their entirety. The materials, methods, and articles disclosed herein are illustrative only and not intended to be limiting.

The singular form "a", "an" and "the" include plural referents unless the context clearly dictates otherwise.

As used in the specification and in the claims, the term "comprising" may include the embodiments "consisting of" and "consisting essentially of". The terms "comprise(s)", "includes(s)", "having", "can", "contain(s)", and variant thereof, as used herein, are intended to be open-ended transitional phrases that require the presence of the named ingredients/steps and permit the presence of other ingredients/steps. However, such description should be construed as also describing compositions, mixtures, or processes as "consisting of" and consisting essentially of" the enumerated ingredients/steps, which allows the presence of only the named ingredients/steps, along with any impurities that might result therefrom, and excludes other ingredients/steps.

Unless indicated to the contrary, the numerical values which differ from the stated value by less than the experimental error of the conventional measurement technique of the type used to determine the particular value.

All ranges disclosed herein are inclusive of the recited endpoint and independently combinable (for example, the range of "from 2 to 10" is inclusive of the endpoints, 2 and 10, and all the intermediate values). The endpoints of the ranges and any values disclosed herein are not limited to the precise range or value: they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially", may not be limited to the precise value specified, in some cases. The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%", may indicate a range of 9% to 11%, and "about 1" may mean from 0.9 to 1.1. The term "substantially" reflects a modification of shape or form that does not affect the necessary function of the associated article or material.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

For the purpose of this disclosure, the term "molten material" will be used to describe aluminum or a mixture of alloys that includes aluminum, other metal elements or alloy that has been melted into a molten form and is not limited as to the various elements that are included therein.

Figure 2:
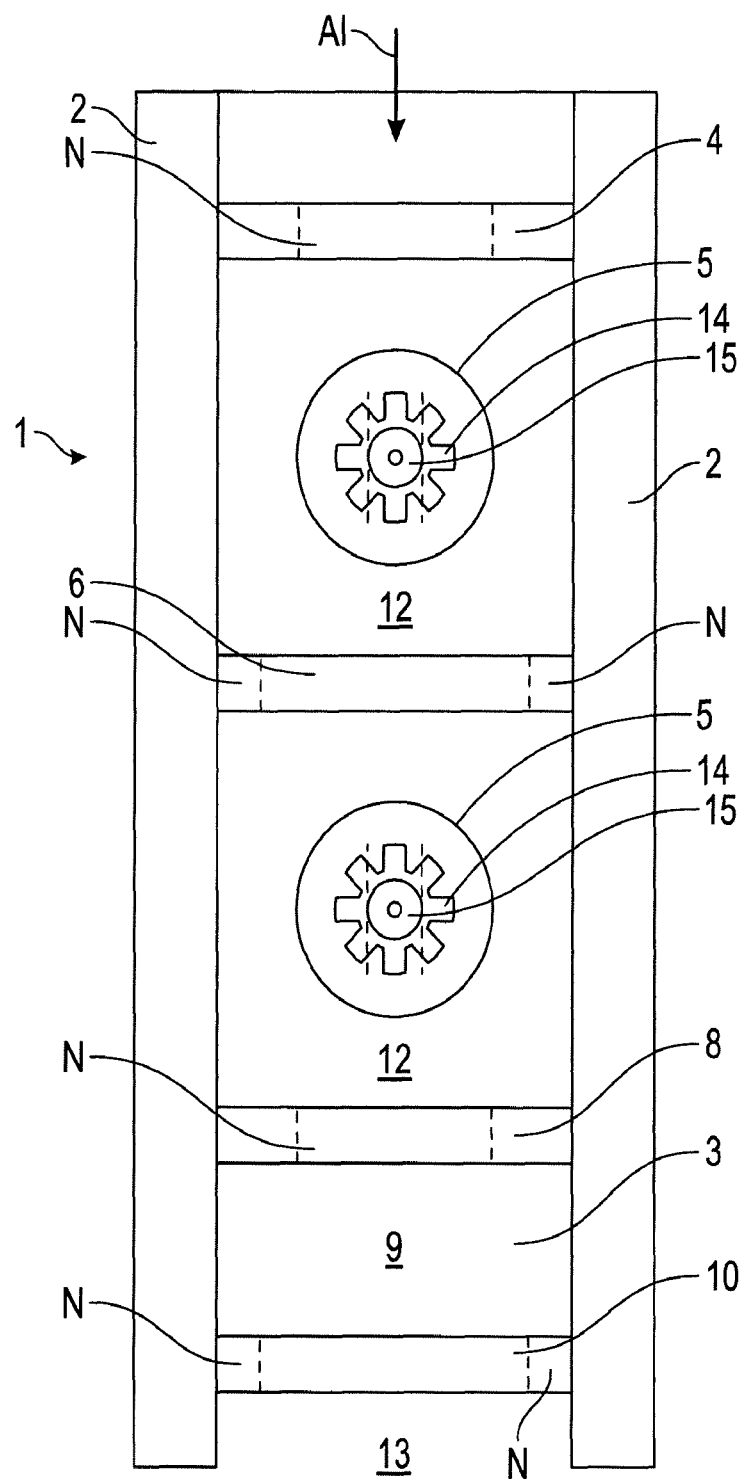
FIG. 2 is a top view of the launder assembly of FIG. 1.

As shown in FIGS. 1 and 2, a launder 1 is formed of side walls 2 and a floor 3 segregated into chambers by partition plates 4, 6, and 8, which can control the flow of molten aluminum "Al" in the launder. A settling chamber 9 is refined by partition plates 8 and 10 and is provided before the exit 13 of the launder. Molten aluminum flows from the last degassing chamber 12 into the settling chamber 9.

The partition plates 4, 6, 8 and 10 are arranged to be perpendicular to a direction of the flow of the molten aluminum, and parallel to each other. Notches "N" are arranged on a lower portion of the partition plates. Partition plates 4 and 8 include a centrally disposed notch and partition plates 6 and 10 include notches disposed at each edge adjacent sidewalls 2. This staggered notch arrangement forces molten aluminum in the launder to flow in relatively turbulent subsurface manner and to avoid channeling (i.e., not merely longitudinally within the launder). The notches can have the shape of a triangular, square, circular, semi-circular or other.

Two adjacent partition plates (e.g. 4 and 6 or 6 and 8) form a degassing chamber 12. The molten aluminum flows through each degassing chamber sequentially for degassing. Dome 5 is mounted on the floor of the degassing chamber 12 below a rotor 14 which is suspended from a rotatable shaft 15. The dome can have a height of 10 to 100 mm and a diameter of 100 to 1000 mm. The distance between the rotor 14 and the dome 5 can range from 10 to 100 mm. The launder can have a flow cross section width of 100 to 600 mm, a height of 100 to 600 mm, and a length of 500 to 4000 mm. The molten aluminum can have a depth of 100 to 500 mm. The flow of molten aluminum exits the settling chamber to a casting launder which feeds a casting device.

Figure 14:
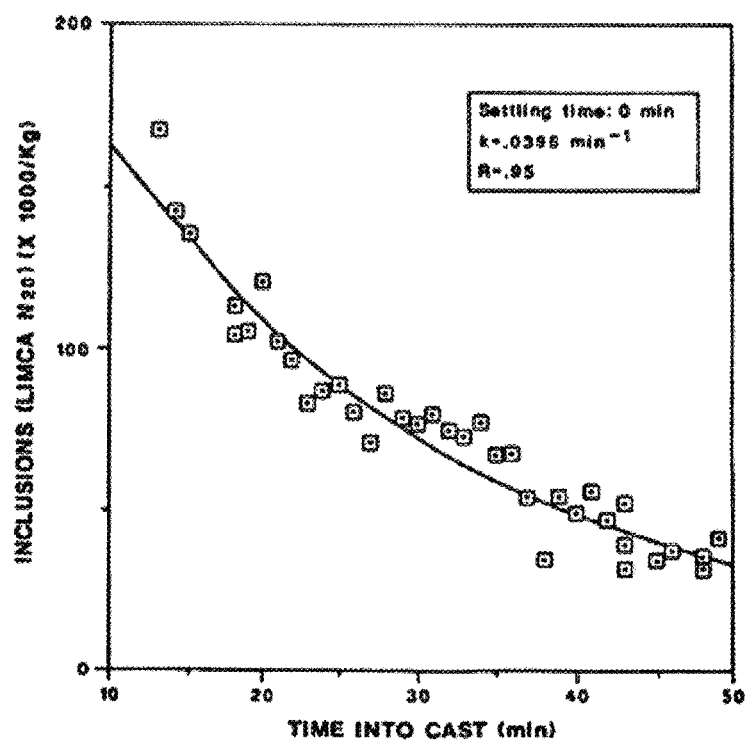
FIG. 14 graphically illustrates the use of a settling chamber as a mechanism for removing inclusions from the molten aluminum.

The settling chamber 9 does not include a rotor or a dome. Its purpose is to allow the tiny bubbles to rise up to the free surface before being carried into a casting launder connected to a casting device. The other benefits of the settling chamber are to allow the heavier inclusions to settle at the trough bottom and to maintain the generated dross during the degassing process into the settling chamber and not be carried over into the regular casting trough. FIG. 14 illustrates the use of a settling chamber as a mechanism for removing inclusions from the molten aluminum.

Figure 3:
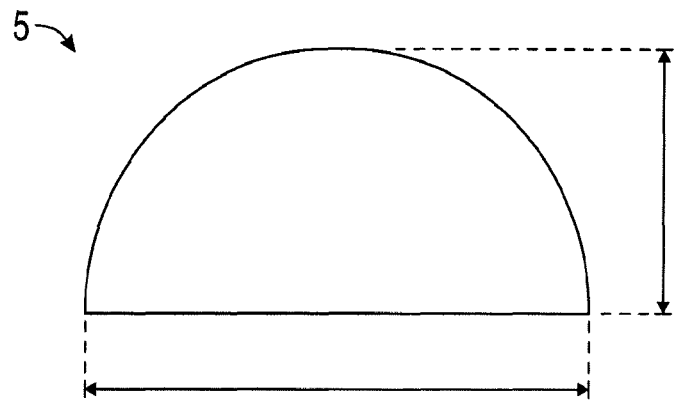
FIG. 3 is a schematic illustration of an exemplary dome.

An exemplary dome is illustrated in FIG. 3. Although illustrated as substantially a semi-sphere, it is contemplated that the dome can depart from an ideal geometric shape and still provide benefit in the degassing process. For example, it is contemplated that the dome could have at least partially removed edges, particularly the edge(s) running parallel to the launder sidewalls.

Figures 4, 5:
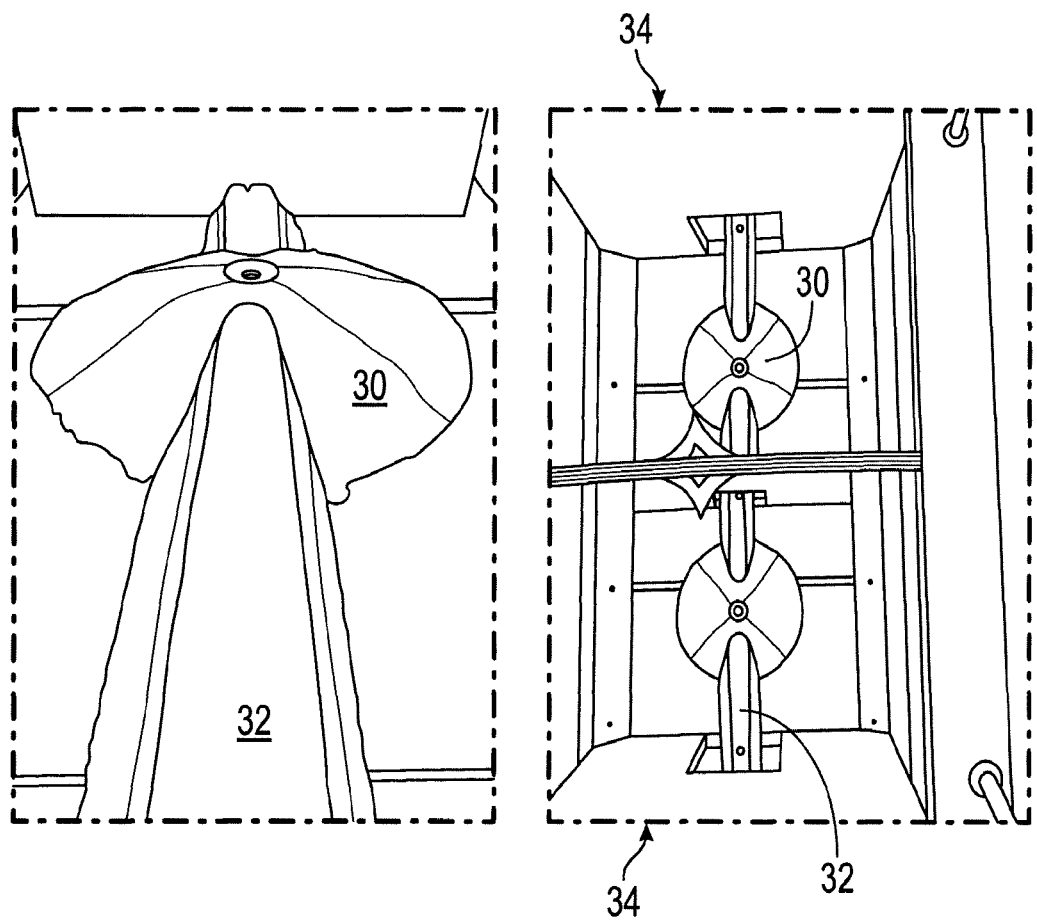
FIG. 4 displays an alternative dome and rib configuration.
FIG. 5 is a top view of a launder including the dome and rib configuration of FIG. 4.

Alternatively, a flattened dome 30 as illustrated in FIGS. 4 and 5 is considered suitable. In some embodiments, it may be beneficial to include a rib element 32 extending fully or partially across a width or length of the degassing chamber 34 and optionally intersecting the dome.

Figure 6:
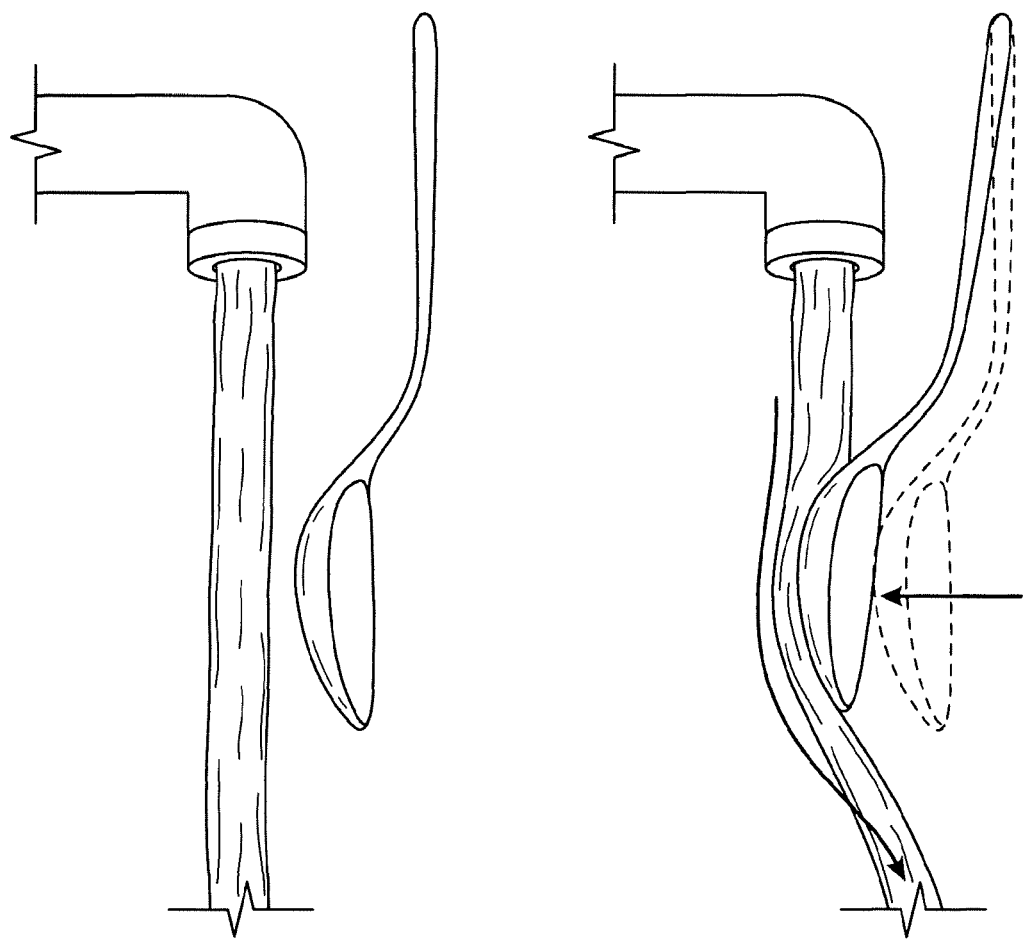
FIG. 6 is an illustration of the Coanda effect.

The domes have been found to advantageously provide the Coanda effect. FIG. 6 illustrates the Coanda effect wherein a moving stream of fluid in contact with a curved surface tends to follow the curvature of the surface rather than continue traveling in a straight line. The Coanda effect in a launder has been found to increase stirring of the subsurface molten metal without significantly increasing undesirable surface turbulence.

The number of the partition plates can range from 2 to 10 and the number of degassing chambers can range from 1 to 9. It is contemplated that at least one degassing chamber will include a dome. It is also contemplated that more than one dome can be present in a degassing chamber. Molten aluminum can flow into the degassing chambers in proximity with the rotor where inert gas (such as argon or nitrogen) and or flux (such as chlorine gas and/or alkali salt(s)) may be injected into the molten aluminum. The rotor may be configured to provide flux with an inert gas. Alternatively, or additionally, a plurality of flux dispersing rods can be provided.

The inert gas may be broken into tiny bubbles by the rotor when rotated at high speed. The tiny bubbles may uniformly diffuse and rise in the molten metal. Since the hydrogen partial pressure in the inert gas bubbles is low, hydrogen ions in the molten aluminum may diffuse into the bubbles and rise to the free surface with the bubbles. Due to the flow guiding effect of the partition plate(s) and dome(s), the flowing state of the molten aluminum is converted from a longitudinal flow to a turbulent flow, increasing the length of the flow track.

In the present launder, the flow of molten material is manipulated as it flows passed the partition plates and becomes generally turbulent. This generally turbulent flow is further enhanced by the dome(s), without significantly increasing the level of surface turbulence.

Since the dome(s) can be located below the rotor, part of the inert gas ejected from the rotor can be broken into smaller bubbles, which increases the efficiency of hydrogen removal. Under the flow guiding effect of the domes, a flow of the molten metal is parallel to the launder bottom and upwards. Therefore, the flow of the molten aluminum can contact the rising inert gas bubbles, and improve the efficiency of hydrogen removal. Accordingly, the molten aluminum can contact inert gas and/or flux more fully and more uniformly for a longer period of time and the degassing efficiency can be improved.

Referring again to FIG. 1, the launder assembly can be provided with a removable cover 16 in order to prevent excessive heat loss from the upper surface of the molten metal. The removable cover can be associated with a mechanical arm apparatus 18 (hydraulic for example) that allows cover 16 to be lifted and rotated either 90° or 180°. Removal of the cover allows the internal elements of the launder to be easily accessed. The lid 16 can be positioned less than or equal to 3 inches from a surface of the molten aluminum when the launder is at its preferred operational fill level. This allows spitting droplets from the degassing process to remelt.

The launder, partition plates, ribs and domes can be formed by integral casting and sintering. Alternatively, the elements can be separately formed and cemented together, optionally with the aid of an interference fit. The casting material can be a high-strength refractory material which is resistant to corrosion by molten aluminum, such as disclosed in U.S. Pat. Nos. 4,898,367 and 5,143,357 which are each herein incorporated by reference.

Figure 7:
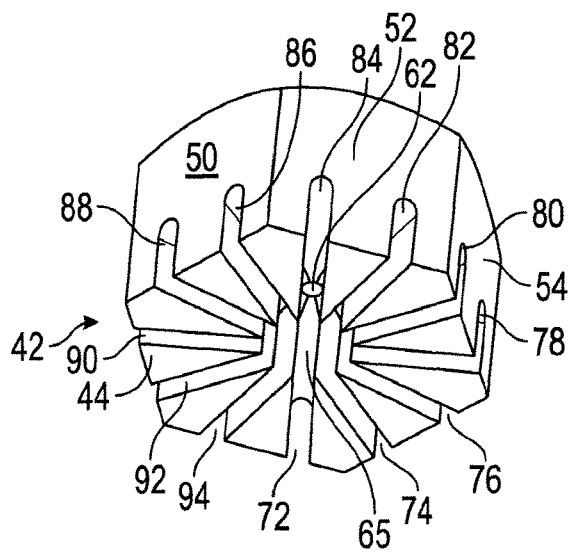
FIG. 7 is a bottom perspective view of a rotor design.
Figure 8:
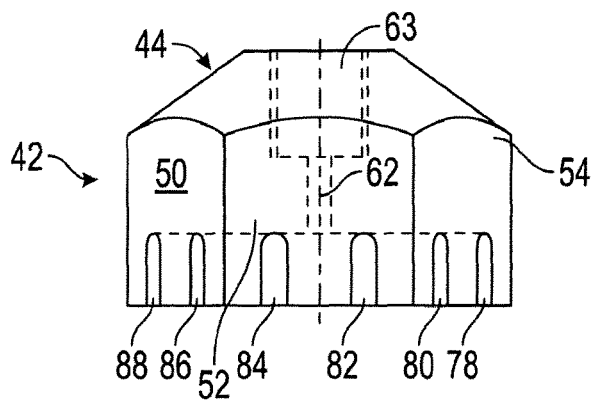
FIG. 8 is a side view of the rotor of FIG. 7.
Figure 9:
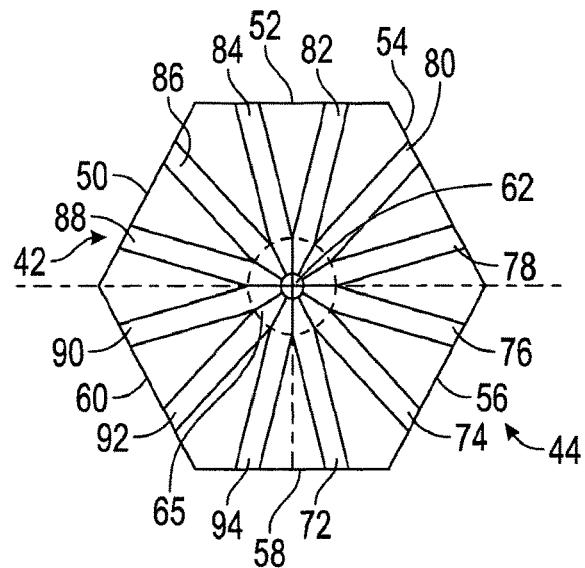
FIG. 9 is a bottom view of the rotor of FIG. 7.

While the dome inclusive launder can be used with a rotor of any shape, the present disclosure is further directed to a more efficient rotor. As is illustrated in FIGS. 7-9, rotor 42 is the form of a hexagonal body having an upper face 44, a lower face 46 and side walls 50, 52, 54, 56, 58, 60. The rotor 42 includes a gas discharge passage 62 extending into a cavity 65 formed in the lower face 46. The gas discharge passage 62 constitutes a portion of a threaded opening 64 that extends through the rotor 42 and which opens through the upper and lower faces 44, 46. The lower face 46 can be planar and approximately perpendicular to the side walls 50, 52, 54, 56, 58 and 60. The upper face 44 can be upwardly sloped to provide increased mass adjacent the shaft receiving hub 63. Hub 63 can be threaded.

A plurality of grooves 72, 74, 76, 78, 80, 82, 84, 86, 88, 90, 92, 94 extend radially outward from the cavity 65. The grooves re disposed on the lower face 46. Each of the grooves includes a pair of opposed parallel sidewalls 96 and a rounded internal surface 98. Each groove extends from the cavity to a respective side wall and the respective groove is open at the side wall. In the depicted embodiment each side wall is intersected by two grooves.

The grooves are disposed at approximately equal angles to each other, that is, any given groove is disposed equidistantly between adjacent grooves. The grooves include longitudinal axes L (which is also a symmetrical axis) that are aligned with each other and that extend from one side to the opposed side (one axis for two grooves, each on an opposite side of the cavity). The longitudinal axes are parallel to a greatest dimension of each groove and are colinear with the radius of the cavity rounded at its innermost surface. The cross-sectional area taken normal to the longitudinal axis can remain constant from the distal end of the groove to where the groove intersects the cavity.

The rotor 42 and its association shaft can be made of graphite, particularly if the molten metal being treated is aluminum. If graphite is used, it can be coated or otherwise treated to resist oxidation and erosion. Oxidation and erosion treatments for graphite parts are practiced commercially, and can be obtained from sources such as Pyrotek, Inc., 355 Campus Drive, Aurora, Ohio 44202-6662. However, other materials can be used such as: refractory, ceramic, Sialon, etc.

EXAMPLES

Figure 12:
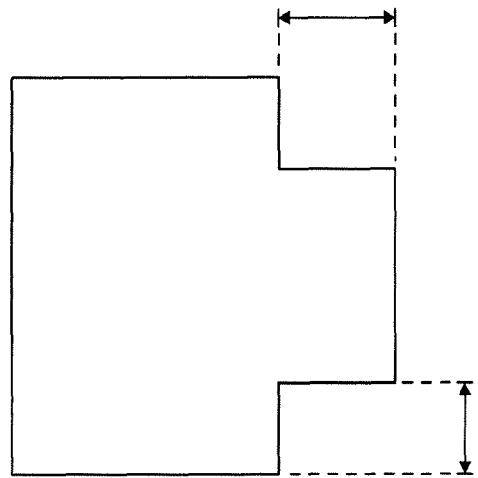
FIG. 12 is a schematic illustration of the second partition of FIG. 10.
Figure 11:
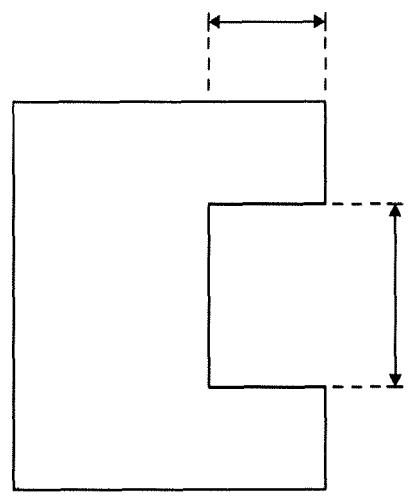
FIG. 11 is a schematic illustration of the first and third partition plates of FIG. 10.
Figure 10:
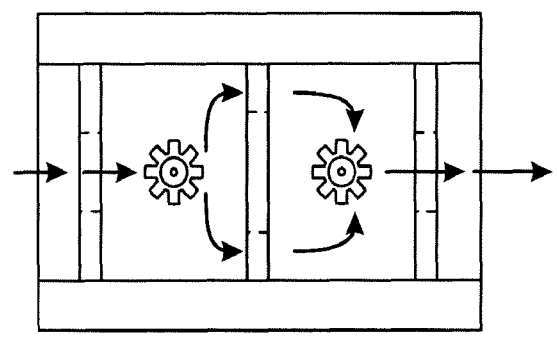
FIG. 10 is a schematic illustration of a tested launder design.

Water Model Descriptions:

All tests were carried out with a 30,000 lb/hour flow rate which corresponds to an acceptable flow rate for a 2-rotor unit. FIG. 10 illustrates the launder assembly configuration in which the testing was performed. The first and third partition walls had the configuration of FIG. 11 and the second partition wall had the configuration of FIG. 12. Model 1 was composed of a rectangular Plexiglass trough having 18.25" W×19" H×38" L. Model 2 was composed of a rectangular Plexiglass trough having 22" W×19" H×38" L.

Rotors were evaluated at 800 rpm. 5 CFM per rotor of pure nitrogen was employed. Oxygen was introduced in water using a bubbling set-up in a separate tank just before the water model tank itself. The typical temperature of the water was 15° C. At that temperature, the maximum solubility of oxygen is 10 mg/l or 10 ppm. Oxygen measurement probes were used at the trough entrance and exit to monitor oxygen removal during the degassing process. The probes were calibrated, and both probes measured around 9.0 ppm at the start. 90% of tests were at 10" or 255 water mm height.

Effect of Rotor Design

Figure 13A:
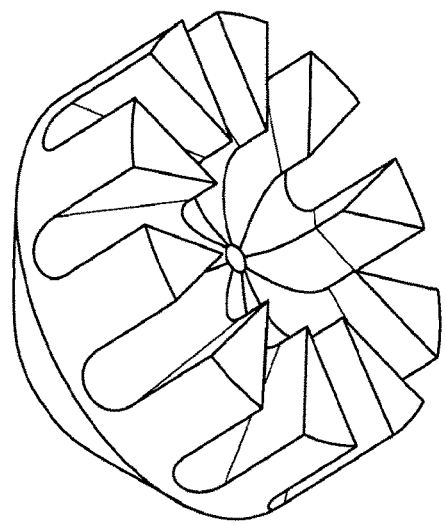
FIGS. 13A, 13B and 13C are illustrations of tested rotors.
Figure 13B:
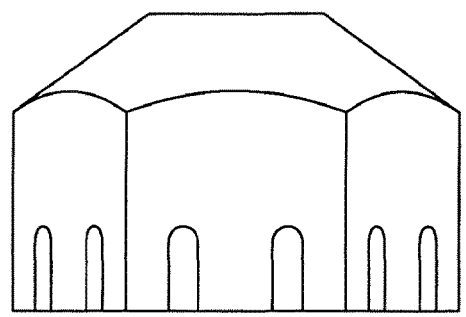
Figure 13C:
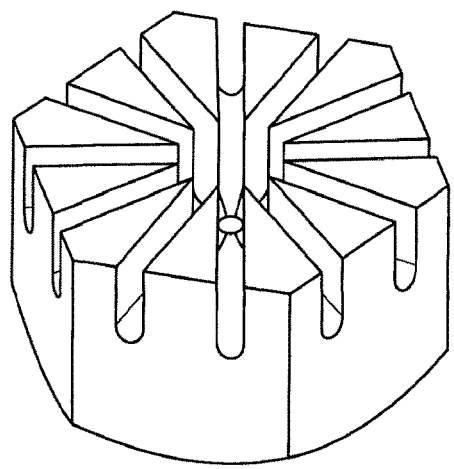

Baffles: Solid end baffles with 100 mm cut on all width at the bottom (Note: not the illustration configuration)
Bottom dome: No
Corner rib: Yes, 2" radius Three types of rotors were tested. The STAS 4.5" rotor is shown in FIG. 13A, the Pyrotek StarBurst 4.5" rotor is shown in FIG. 13B, and the presently disclosed hexagonal 5" diameter rotor (the "Hexa rotor") is illustrated in FIG. 13C.

Figure 15:
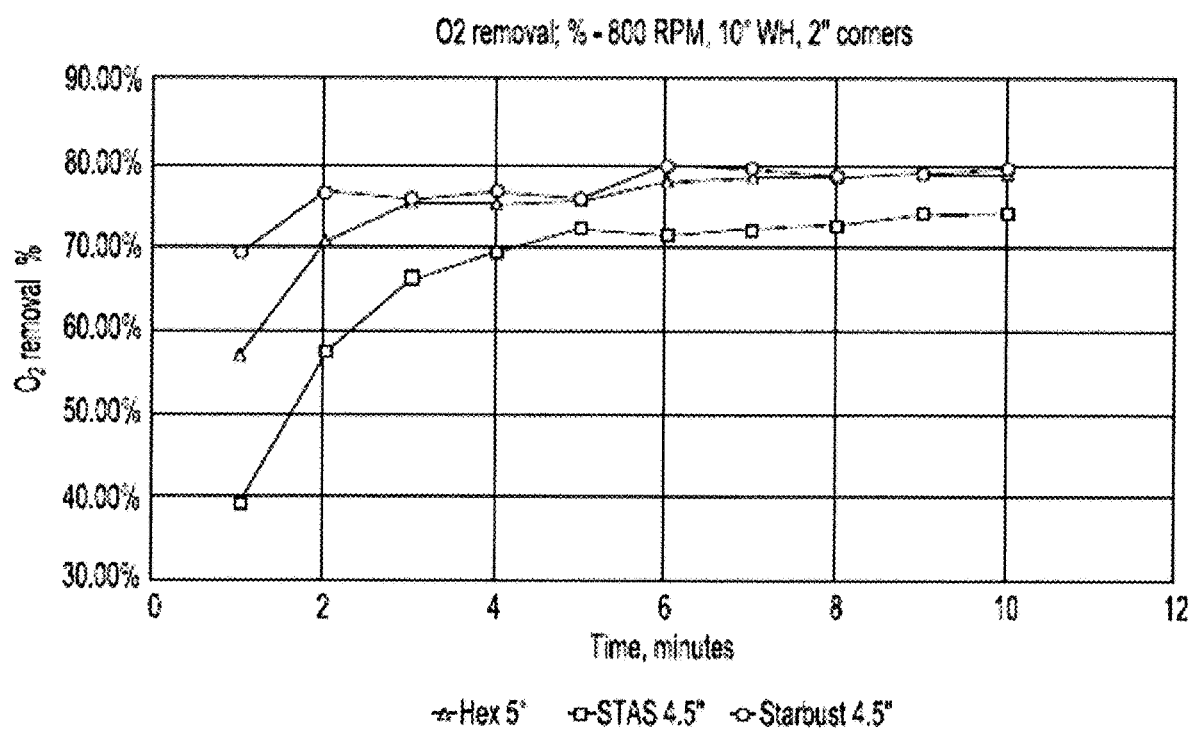
FIG. 15 graphically shows the oxygen removal efficiency versus rpm.

FIG. 15 shows the oxygen removal efficiency versus rpm.

The StarBurst and Hexa rotors show better oxygen removal than the STAS 4.5" rotor. In spite of a very similar oxygen removal efficiency between the StarBurst 4.5" and the Hexa Rotor, the Hexa rotor shows less surface turbulence.

Effect of Distances & Rpm

Figure 16:
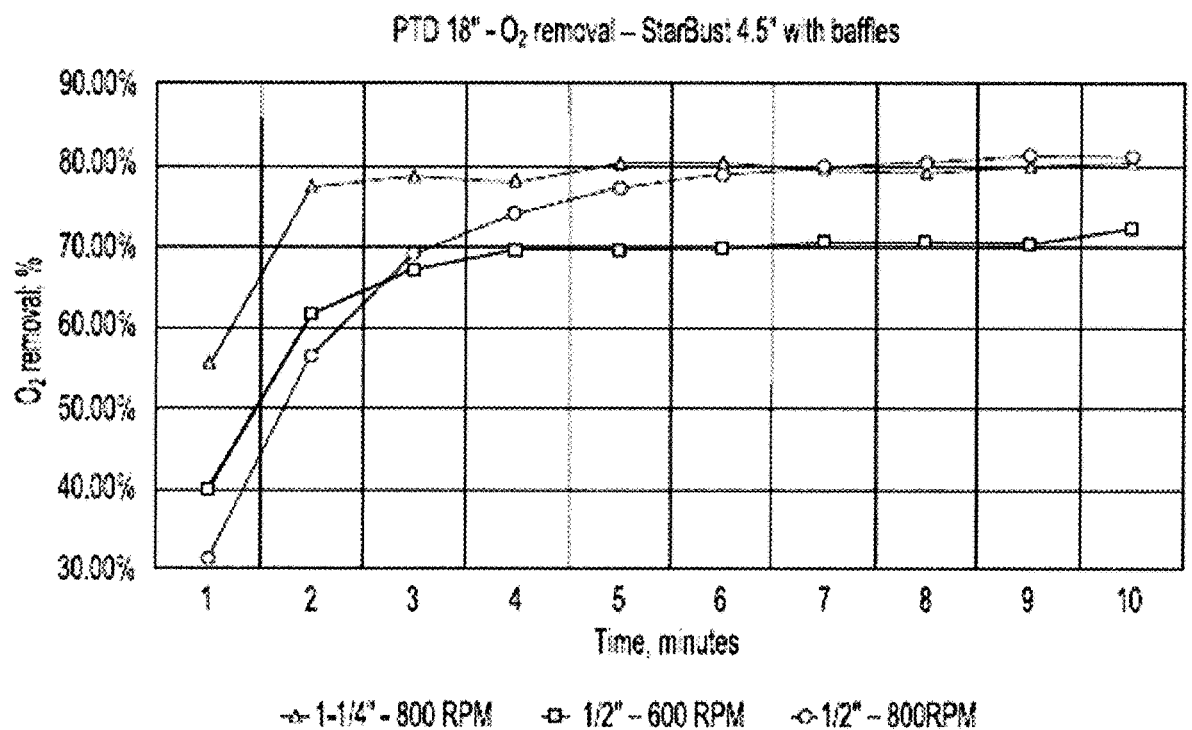
FIG. 16 graphically demonstrates the importance of the rotor rotation speed on the oxygen removal efficiency.

Baffles: End baffles with centered 6"×6" (152 mm×152 mm) opening, middle baffle with 2 openings of 3"×6" (75 mm×152 mm) on each side
Bottom dome: No
Corner rib: Yes, 2" radius The results of FIG. 16 demonstrate the importance of the rotor rotation speed on the oxygen removal efficiency.

Effect of Rotors and Domes

Figure 17:
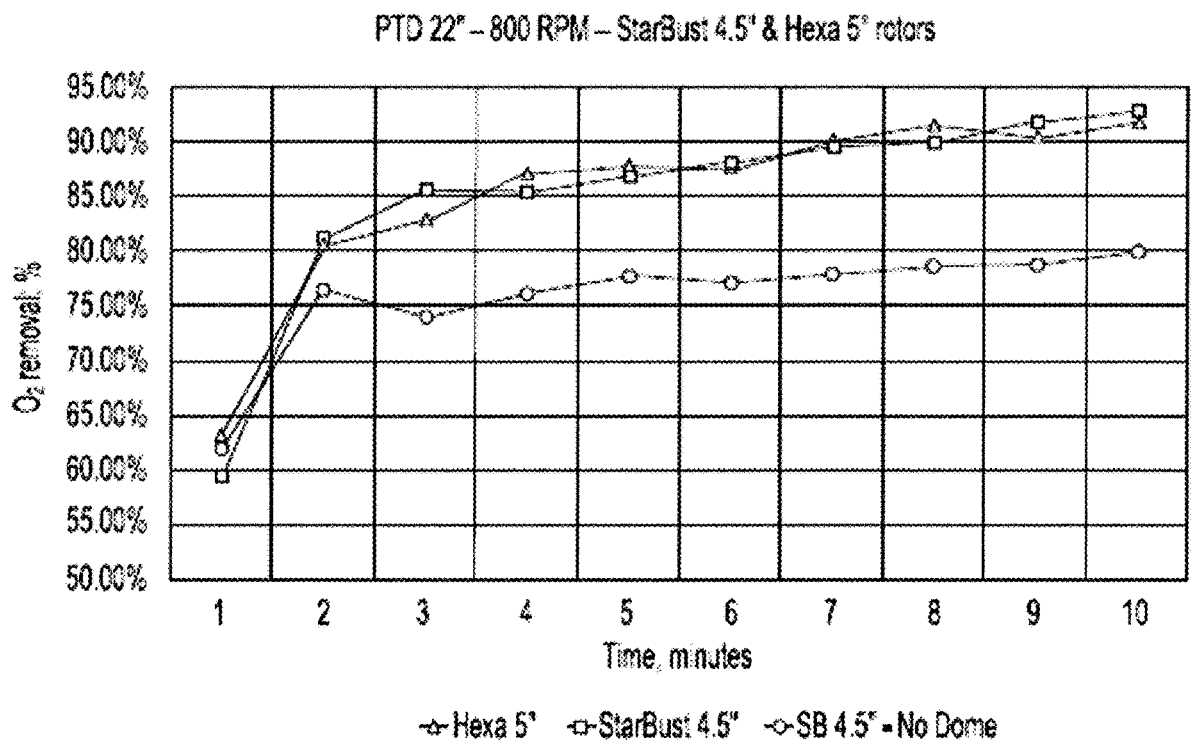
FIG. 17 graphically illustrates the presence of the domes significantly increases the oxygen removal efficiency.

Baffles: End baffles with centered 6"×6" (152 mm×152 mm) opening, middle baffle with 2 openings of 3"×6" (75 mm×152 mm) on each side
Bottom dome: Yes, 1.5" H×6" diameter
Corner rib: Yes, 2" radius As demonstrated by FIG. 17 the presence of the domes significantly increases the oxygen removal efficiency. A 16% better oxygen removal was measured. The hexa rotor also reduced surface turbulence.

Effect of Dome/Rib Combination

The dome/rib elements of FIGS. 4 and 5 show the dome and rib system used under each rotor. The oxygen removal percentage is illustrated in the graph below. For comparison purposes the ribs were removed, and the oxygen removal percentage curve also appears in FIG. 18.

Figure 18:
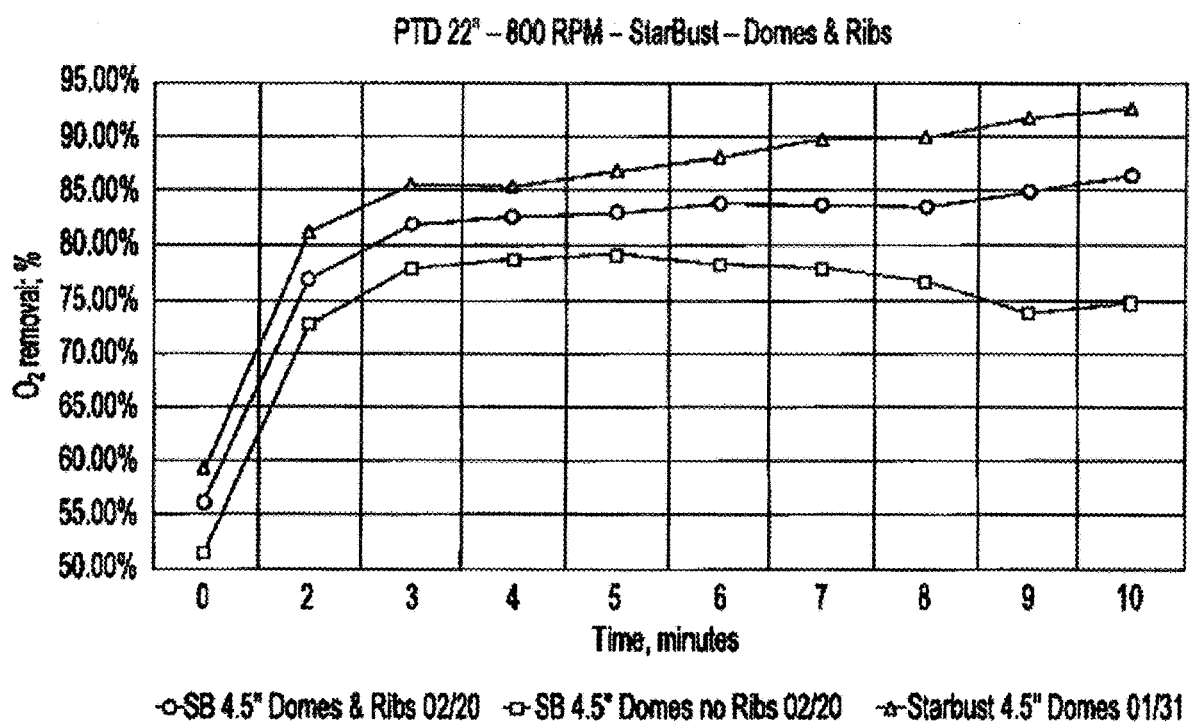
FIG. 18 graphically illustrates the smaller dome & rib combination showed a better oxygen removal percentage than without ribs but not as good as with the aggressive dome geometry.

As demonstrated by FIG. 18 the smaller dome & rib combination showed a better oxygen removal percentage than without ribs but not as good as with the aggressive dome geometry.

Various embodiments of the disclose have been described. Obviously, modifications and alterations will occur to others upon reading and understanding the preceding detailed description. It is intended that the embodiments are construed as including all such modifications and alterations insofar as they come within the scope of the appended claims or the equivalents thereof.

The invention claimed is:

1. A degassing launder comprising a launder including a plurality of partition plates configured to partially block a flow of molten metal in the launder, two adjacent partition plates and a floor and two side walls of the launder forming a degassing chamber, a lower portion of each partition plate being provided with at least one passage through which the molten aluminum flows, wherein the floor of the degassing chamber is provided with a dome shape projection positioned below a rotor, and wherein said rotor has a circumference and wherein a circumference of the dome is greater than the circumference of the rotor.

2. The degassing launder of claim 1, wherein the partition plates are arranged to be perpendicular to a direction of the flow of the molten aluminum and parallel to each other.

3. The degassing launder of claim 1, wherein the passage is a notch arranged on a bottom edge of the partition plate.

4. The degassing launder of claim 1, wherein the passage has a triangular, square, circular or semi-circular shape.

5. The degassing launder of claim 1, wherein said dome shaped projection is at least substantially a semi-sphere.

6. The degassing launder of claim 1, further comprising a settling chamber at an exit side of the launder, said settling chamber being comprised of two adjacent partition plates, a floor and two side walls of the launder, a lower portion of each partition plate including at least one passage, and wherein the floor does not include a projection.

7. The degassing launder of claim 1, further comprising a lid, said lid including a lifting mechanism capable of rotating the lid 90° and/or 180°.

8. The degassing launder of claim 7, wherein said lid is less than or equal to 3" from molten aluminum surface when the launder is at an operational fill level.

9. The degassing launder of claim 1, wherein said dome shaped projection is not a semi-sphere.

10. The degassing launder of claim 1, wherein said rotor introduces a flux.

11. A degassing launder comprising a launder including a plurality of partition plates configured to partially block a flow of molten metal in the launder, two adjacent partition plates and a floor and two side walls of the launder forming a degassing chamber, a lower portion of each partition plate being provided with at least one passage through which the molten aluminum flows, wherein the floor of the degassing chamber is provided with a semi-sphere dome shape projection positioned below a rotor, the degassing launder further comprising a rib shaped projection on the floor of said degassing chamber.

12. The degassing launder of claim 11, wherein the rib shaped projection intersects said dome shaped projection.

13. The degassing launder of claim 11, wherein said rotor has a circumference and wherein a circumference of the dome is greater than the circumference of the rotor.

14. The degassing launder of claim 13, wherein the circumference of the dome is at least 15% greater than the circumference of the rotor.

* * * * *